United States Patent [19]
Tobita et al.

[11] Patent Number: 5,412,992
[45] Date of Patent: May 9, 1995

[54] DIFFERENTIAL PRESSURE SENSOR CAPABLE OF REMOVING INFLUENCE OF STATIC PRESSURE AND A METHOD OF ASSEMBLING THE SAME

[75] Inventors: Tomoyuki Tobita, Katsuta; Akira Sase, Tokyo; Yoshimi Yamamoto, Ibaraki; Kenichi Aoki, Katsuta, all of Japan

[73] Assignee: Hitachi, Ltd., Tokyo, Japan

[21] Appl. No.: 986,023

[22] Filed: Dec. 4, 1992

[30] Foreign Application Priority Data

Dec. 9, 1991 [JP] Japan .................. 3-324226

[51] Int. Cl.⁶ ........................... G01L 9/06
[52] U.S. Cl. ........................... 73/721; 73/727; 338/4
[58] Field of Search .............. 73/721, 720, 708, 726, 73/727; 374/143; 338/4; 29/621.1

[56] References Cited

U.S. PATENT DOCUMENTS

| | | | |
|---|---|---|---|
| 4,276,533 | 6/1981 | Tominaga et al. | 73/727 X |
| 4,528,855 | 7/1985 | Singh | 338/4 X |
| 4,658,651 | 4/1987 | Le | 73/708 |
| 4,765,188 | 8/1988 | Krechmery et al. | 73/708 |
| 4,993,265 | 2/1991 | Koen et al. | 73/706 |
| 5,193,394 | 3/1993 | Suda | 73/727 X |

FOREIGN PATENT DOCUMENTS

| | | |
|---|---|---|
| 9704 | 12/1982 | Japan . |
| 61-240134 | 4/1986 | Japan . |
| 4320938 | 11/1992 | Japan .................. 73/720 |
| 1605146 | 11/1990 | U.S.S.R. .................. 73/720 |

Primary Examiner—Richard E. Chilcot, Jr.
Assistant Examiner—Joseph L. Felber
Attorney, Agent, or Firm—Antonelli, Terry, Stout & Kraus

[57] ABSTRACT

A differential pressure sensor is disclosed, and in particular, there is disclosed a multiple function type differential pressure sensor capable of reducing a zero-point-change and a span change of means for detecting a differential pressure when applying a static pressure and being readily manufactured at high accuracy. The multiple function type differential pressure sensor is constructed by a semiconductor chip 1 for detecting a differential pressure, a fixing base 2 which has a joining part 21 joined to a thick part of the semiconductor chip 1 and which has a thickness less than or equal to that of the semiconductor chip 1, and also which has at least one thin part 22 in an outer periphery other than the joining part 21, and a housing 4 joined to the fixing base.

29 Claims, 8 Drawing Sheets

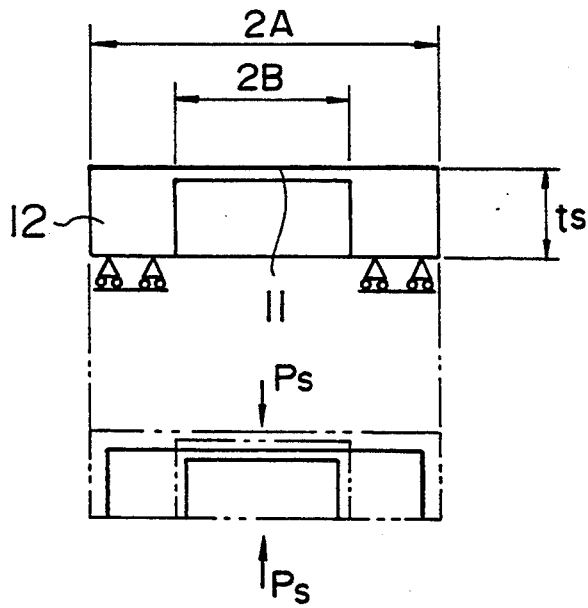
FIG. 4(a)
FIG. 4(b)
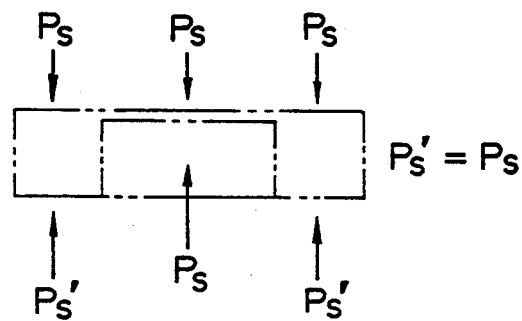
FIG. 4(c)
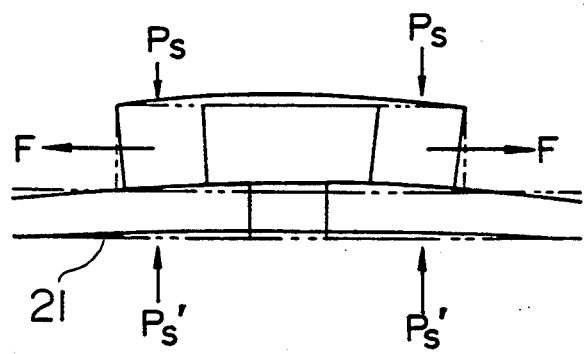
FIG. 4(d)

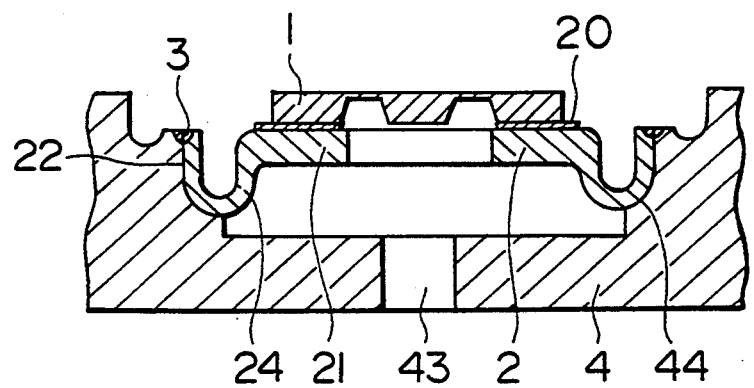
FIG. 8
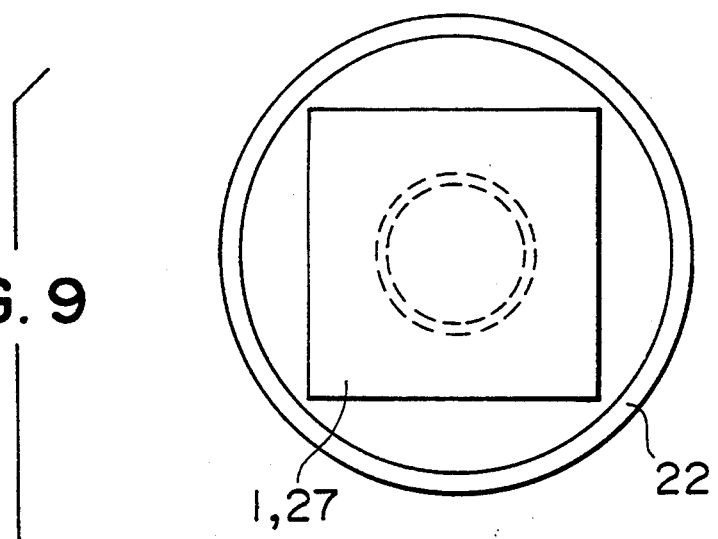
FIG. 9
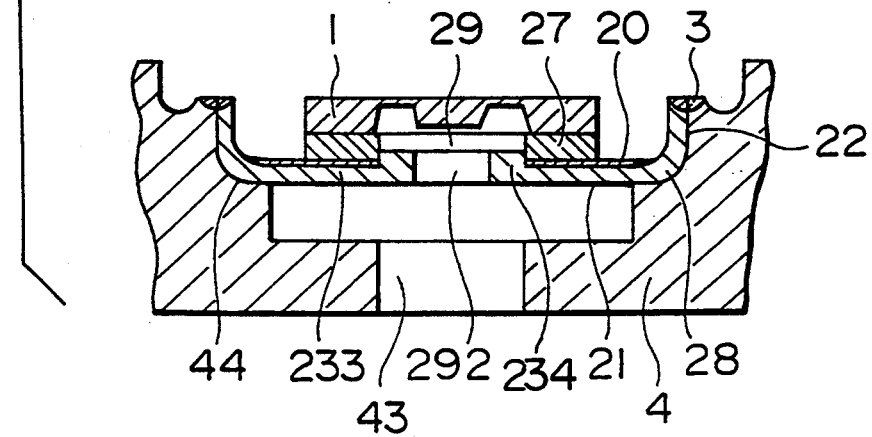

DIFFERENTIAL PRESSURE SENSOR CAPABLE OF REMOVING INFLUENCE OF STATIC PRESSURE AND A METHOD OF ASSEMBLING THE SAME

BACKGROUND OF THE INVENTION

The present invention relates to a differential pressure sensor which is suitable for measuring a differential pressure between two fluids, and more particularly to a multiple function type differential pressure sensor which is capable of measuring even a static pressure and a temperature.

As for a differential pressure sensor for measuring a differential pressure, in particular, a multiple function type differential pressure sensor in which a sensor for measuring a differential pressure, a sensor for measuring a static pressure and a sensor for measuring a temperature are provided on one chip and thus the differential pressure, the static pressure and the temperature can be measured simultaneously, there have been proposed many examples which are disclosed in JP-A-61-240134, and JP-B-2-9704 for example. Each example of the multiple function type differential pressure sensor is designed in such a way that a differential pressure sensor unit as the main sensor includes four resistors which are made of a semiconductor material and are sensitive to a differential pressure, and the four resistors are provided on a part having a relative large wall thickness (thick part) called a pressure sensitive diaphragm. Moreover, on the thick part other than the pressure sensitive diaphragm, several resistors are provided which are made of a semiconductor material and are sensitive to the static pressure (line pressure) and the temperature. Those resistors made of a semiconductor material are formed, together with the above-mentioned resistors made of a semiconductor material, on a semiconductor substrate by the thermal diffusion method or the ion implantation method in the well-known semiconductor manufacturing process. The semiconductor substrate is bonded to a fixing base and the fixing base having the semiconductor substrate bonded thereto is then mounted to a housing. The above-mentioned multiple function type differential pressure sensor of this sort compensates the zero-point-change of the differential pressure sensor, which is due to the line pressure change and the temperature change of the process, by utilizing signals sent from the auxiliary sensors (the sensor for measuring a static pressure, and the sensor for measuring a temperature) provided thereon, thereby to obtain a differential pressure signal at high accuracy.

However, in the above-mentioned examples, in particular, the example disclosed in JP-B-2-9704, the signal for representing a static pressure is obtained by utilizing a bending strain which is due to the difference between a modulus of longitudinal elasticity of the semiconductor substrate and that of the fixing base when applying the static pressure. Therefore, only a compensating signal which has a very small output and a low signal-to-noise (S/N) ratio can be obtained. Moreover, since the bending strain is produced in order to obtain that static pressure signal, the bending strain exerts an influence on the differential pressure sensitive diaphragm of the main sensor, so that the differential pressure signal and the static pressure signal interfere with each other. Therefore, in order to obtain the differential signal at high accuracy, the input-output characteristics of the differential pressure sensor as the data for the compensation need to be finely collected while changing the temperature and the static pressure.

On the other hand, according to the example disclosed in JP-A-61-240134, since the differential pressure and the static pressure, which are the pressures to be detected, are detected through the provision of the respective pressure sensitive parts, the static pressure signal can be obtained which is considerably large as compared with the case of the above-mentioned example. In this example, however, for the purpose of obtaining the signal having a large S/N ratio, it is necessary to provide an introduction line for introducing the reference pressure into a rear surface of a pressure sensitive part for the static pressure signal. Therefore, such an arrangement of the sensor is basically, substantially equal to the new provision of the separate static pressure sensor (pressure sensor). Therefore, the method of assembling a sensor and the manufacturing process become complicated, and as a result, the sensor will be poor in reliability and profitability. If possible, it is desirable from various industrial points of view that the various kinds of sensors are formed on one chip integrally with one another in the manner as in the former example.

As described above, in the multiple function type differential pressure sensors disclosed in the above-mentioned examples, the zero-point-change of the differential pressure sensor as the main strain sensor when applying the static pressure is mainly noticed. Thus, the zero-point-change is compensated using the output signal of the static pressure sensor as a parameter. On the other hand, when applying the static pressure to the differential pressure sensor, not only the change of the zero point as described above but also the change of the span (span change) occurs necessarily. If as the method of compensating the span change, the above-mentioned method of compensating the zero-point-change is used, the compensation data which is obtained by changing the static pressure state and the differential pressure must be collected. As a result, the enormous amount of data will be provided, so that it is difficult to perform the compensation. Therefore, in the prior art differential pressure sensor, if the zero-point-change and the span change are compared with each other, the span change should be regarded as important as compared with the zero-point-change in order to improve the accuracy of the measurement. However, for the span change, the compensation is not performed or the simple compensating method is carried out.

SUMMARY OF THE INVENTION

The present invention was made by considering the above-mentioned circumstances, and a first object thereof is to provide a differential pressure sensor which is designed in such a way as to have a structure which is capable of reducing both the zero-point-change and the span change when applying a static pressure, thereby to be capable of obtaining a pressure signal at high accuracy.

It is a second object of the present invention to provide a differential pressure sensor which is designed in such a way as to have a structure in which in the case where a sensor chip for detecting a pressure on the basis of a strain of a substrate is mounted to a supporting body for fixing the sensor chip thereto to construct the differential pressure sensor, a strain which is produced in the supporting body when mounting the sensor chip to the supporting body, and a strain which is produced in the supporting body when applying a static pressure to the differential sensor do not interfere with a strain of the substrate on the basis of which the sensor chip detects the pressure, thereby to be capable of detecting a pressure at high accuracy.

It is a third object of the present invention to provide a structure of a differential pressure sensor which is suitable for obtaining a pressure signal at high accuracy and is readily manufactured, and a method of assembling the differential pressure sensor.

In order to attain the above-mentioned first object, there is provided a differential pressure sensor including a semiconductor chip having means for detecting a pressure, and a fixing base for fixing the semiconductor chip thereto, the semiconductor chip being joined to the fixing base, a first pressure being applied to a surface of the semiconductor chip opposite to the joining surface, a second pressure being applied to the pressure detecting means of the semiconductor chip through a pressure path provided in the fixing base to detect a differential between the first pressure and the second pressure, characterized in that a thickness of the joining part of the fixing base to which the semiconductor chip is joined is decreased, in particular, the thickness thereof is decreased to be less than or equal to that of the semiconductor chip, and the second pressure for being applied to the pressure path is applied to the joining part.

Moreover, in order to attain the above-mentioned second object, there is provided a differential pressure sensor including a semiconductor chip, and a fixing base for fixing the semiconductor chip thereto, the semiconductor chip being joined to the fixing base to detect a difference between two pressures applied to both surfaces of the semiconductor chip, characterized in that a part of the fixing base which is located outside a joining part, to which the semiconductor chip is joined, is provided with a thin part.

Further, in order to attain the above-mentioned third object, a differential pressure sensor is assembled by joining an end part of a fixing base to a housing in such a way that when an assembly body in which a semiconductor chip is joined to a fixing base is incorporated in the housing, the end part of the fixing base appears in a direction of the incorporation of the assembly body.

The thickness of the joining part of the fixing base to which the semiconductor chip is joined is decreased, in particular, the thickness thereof is decreased to be less than or equal to that of the semiconductor chip, whereby the joining part acts as an absorber for absorbing a strain due to the applied static pressure, or a strain due to the heat and also acts as a pressure working surface for opposing the pressure of the surface of the semiconductor chip. As a result, the thick part of the semiconductor chip is maintained at a state of the hydrostatic pressure. Therefore, even when applying the static pressure to the semiconductor chip, only the strain which shifts the strain corresponding to the static pressure to the stretching side directly and in parallel can be produced in the semiconductor chip. As a result, the strain which causes the measurement error in the part of the semiconductor chip for detecting a pressure can be prevented from being produced, and as a result, both the zero-point-change and the span change of the differential pressure sensor when applying the static pressure can be reduced.

Moreover, the part of the fixing base which is located outside the joining part, to which the semiconductor chip is joined, is provided with the thin part, whereby the thin part can act as the absorber for absorbing the strain of the fixing base produced when applying the static pressure, and the strain produced when assembling the differential pressure sensor. As a result, the measurement error of the differential pressure sensor can be reduced.

Further, when the semiconductor chip is joined to the fixing base and the resultant assembly body is incorporated in the housing to construct the differential pressure sensor, the end part of the fixing base appears in the direction of the incorporation of the assembly body. Therefore, the fixing base can be readily joined to the housing in the same direction as that of the incorporation.

BRIEF DESCRIPTION OF THE DRAWINGS

FIG. 4(a) to FIG. 4(d) are schematic diagrams useful in explaining the principle of the present invention;

FIG. 8 is a cross-sectional view showing a structure of the multiple function type differential pressure sensor according to another embodiment of the present invention;

FIG. 9 is a plan view and a cross-sectional view each showing a structure of the multiple function type differential pressure sensor according to still another embodiment of the present invention.

DESCRIPTION OF THE PREFERRED EMBODIMENTS

The preferred embodiments of a multiple function type differential pressure sensor will hereinafter be described with reference to the accompanying drawings. Incidentally, since a differential pressure sensor is one aspect of the multiple function type differential pressure sensor in terms of structure, it is considered that the present invention can be also applied to a structure of the differential pressure sensor by giving a description to the multiple function type differential pressure sensor.

Figure 1:
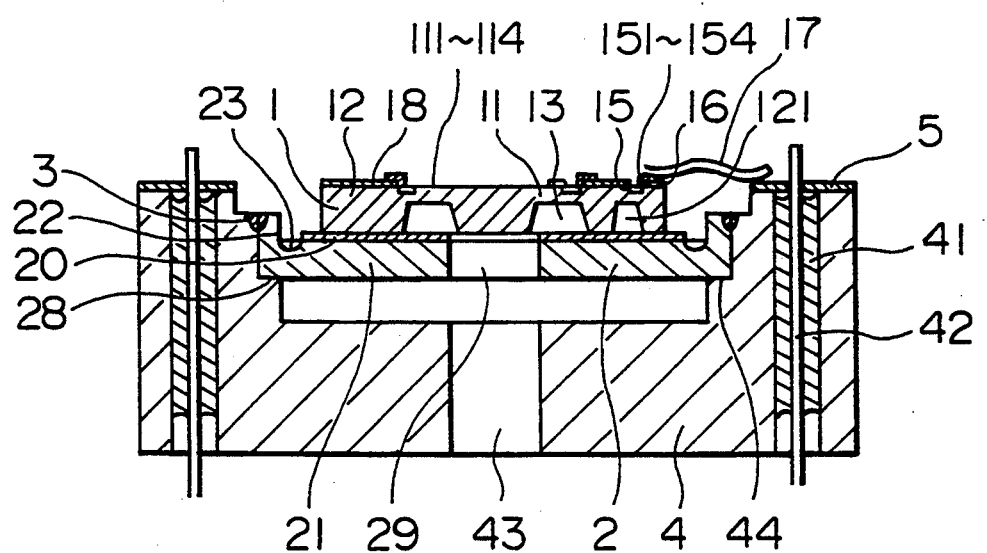
FIG. 1 is a cross-sectional view showing a structure of a multiple function type differential pressure sensor according to one embodiment of the present invention.
Figure 2:
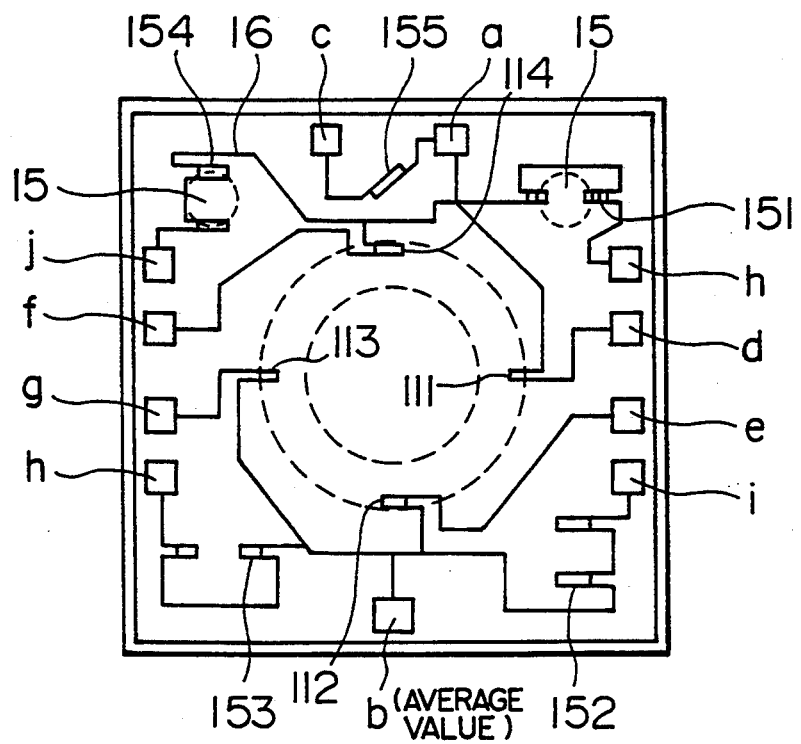
FIG. 2 is a plan view showing a structure of the multiple function type differential pressure sensor according to one embodiment of the present invention.
Figure 3:
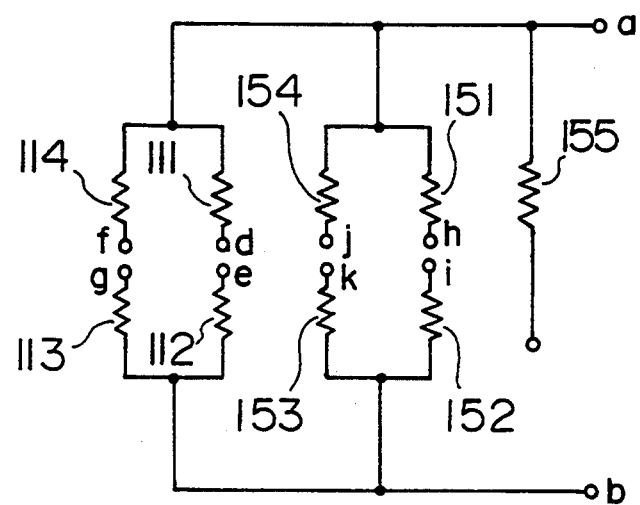
FIG. 3 is a circuit diagram showing an arrangement of a pressure sensor related to one embodiment of the present invention.

FIG. 1 is a cross-sectional view showing a structure of one embodiment of the multiple function type differential pressure sensor of the present invention, FIG. 2 is a plan view showing a structure of a semiconductor chip part of the multiple function type differential pressure sensor of the present invention, and FIG. 3 is a circuit diagram showing an arrangement of the semiconductor chip part.

In FIG. 1, a multiple function type differential pressure sensor chip 1 which is made of single crystalline silicon is bonded to a fixing base 2. The assembly made up of the differential pressure sensor chip 1 and the fixing base 2 is mounted to a housing 4, with joining layer 3 made by welding an oxide solder, metallic solder or binder. By considering the electrical insulation of the multiple function type differential pressure sensor chip 1 from the housing 4 and the reduction of the thermal strain due to a difference between the coefficient of linear expansion of the differential pressure sensor chip 1 and that of the housing 4 into consideration, the fixing base 2 is preferably made of ceramics (e.g., SiC or SiN) or Fe-Ni series alloy which has the coefficient of linear expansion substantially equal to that of single crystalline silicon. However, even if the fixing base 2 is made of a material which has the coefficient of linear expansion different from that of single crystalline silicon, the practical accuracy can be attained. A bonding layer 20 is provided on the side of the bonding surface of the fixing base 2 to the sensor chip 1. The bonding layer 20 may be formed by glazing the bonding surface of the fixing base 2 with oxide solder such as a low melting point glass, or may be formed of a thin film of metallic solder, an Au-Sn or Au-Si series alloy layer, or Au by a sputtering method or vacuum evaporation method. Alternatively, the bonding layer 20 may be also made of organic or inorganic binder. By providing the bonding layer 20 on the side of the bonding surface of the fixing base 2 to the sensor chip 1, it is possible to readily bond the sensor chip 1 to the bonding layer 20 at a low temperature. Moreover, since a thickness of the bonding layer is small, the influence of the bonding strain can be reduced as much as possible.

The signals which have been sent from the multiple function type differential pressure sensor chip 1 and represent a differential pressure, a static pressure and a temperature, respectively, are outputted from terminals 42 of hermetic sealing parts 41 provided in the housing 4 to the-outside through leads 17 and a wiring board 5. The multiple function type differential pressure sensor chip 1 is made of n type single crystalline silicon having a (100) orientation and one surface of the sensor chip 1 includes a circular or polygonal thin part 11 about at a center thereof. On the other hand, the other surface of the sensor chip 1 has a recess part 13 which is formed so as to confront the fixing base 2 which has a hole 29 at the center thereof. One of the pressures between which the differential pressure to be detected is obtained through the hole 29 to the recess part 13 and through a hole 43 in the housing 4. As a result, the thin part 11 becomes a strain generating membrane which is sensitive to the differential pressure, and acts as a pressure sensitive diaphragm for detecting a differential pressure. On the upper surface of the pressure sensitive diaphragm 11 for detecting a differential pressure, in a direction of the <110> axis in which the piezoresistance coefficient in the (100) plane becomes maximum, P type resistors (guage resistors) 111 to 114 are formed in parallel with or perpendicularly to the crystal axis by the thermal diffusion method or the ion implantation method. The resistors 111 to 114 are arranged in the positions at which the radial strain and the circumferential strain, which are produced on the pressure sensitive diaphragm 11 for detecting a differential pressure when applying the differential pressure, become maximum. Moreover, with respect to the directions of arrangement of those resistors, the resistors 111 and 113 are arranged radially, and the resistors 112 and 114 are arranged tangentially to form a bridge circuit as shown in FIG. 3, whereby it is possible to obtain a differential pressure signal having a large magnitude. The pressure sensitive diaphragm 11 for detecting a differential pressure is formed so as to have a predetermined shape and thickness depending on the differential pressure to be sensed, i.e., by the anisotropic wet etching technique or the dry etching technique.

When a pressure is applied to the sensor chip 1, the resistors 111 to 114 on the pressure sensitive diaphragm 11 for detecting a differential pressure are subjected to the strain which is due to the differential pressure between the upper surface and the recess part 13 of the diaphragm, and as a result, their resistance values are changed by the piezoresistance effect. Therefore, if the circuit system as shown in FIG. 3 is employed, it is possible to take out signals corresponding to the differential pressure from terminals d to g.

In the prior art sensor, those resistors 111 to 114 are actuated when the pressures, which are applied to the both surfaces of the pressure sensitive diaphragm 11 for detecting a differential pressure, are equal to each other (static pressure state) as well as when the temperature is changed, and as a result, their outputs are changed. Out of those changes, the static pressure state output change is called the zero-point-change due to the static pressure, and the temperature output change is called the zero-point-change due to the temperature change. In this connection, the zero-point-change when the temperature is changed is mainly due to the dispersion of the resistance values of the resistors 111 to 114, and the resistance value of each resistor is a function which depends on the temperature. Therefore, since the relationship between the output of the differential pressure sensor and the temperature is clearly determined, the compensation can be also performed with ease. The zero-point-change when applying the static pressure is mainly due to the strains which are produced in the elements, such as the fixing base 2 and the housing 4, other than the sensor chip 1 when applying the static pressure. With respect to the zero-point-change when applying the static pressure as well, in the same manner as in the case of the zero-point-change when the temperature is changed, if the relationship between the zero-point-change of the differential pressure sensor and the output of the static pressure sensor when applying the static pressure is stored as the information in the memory, the compensation can be performed on the basis of the information thus stored in a relatively easy manner.

Moreover, when applying the static pressure, in addition to the above-mentioned zero-point-change, the differential pressure sensitivity is also changed. This change is called the span change. The cause of this span change will hereinbelow be described. Normally, the sensor chip 1 includes a thick part 12 as shown in FIG. 1, and is bonded to the fixing base 2 and the like through the thick part 12. The assembly made up of the sensor chip 1 and the fixing base 2 is mounted to the housing 4.

In this connection, when applying the static pressure, the strain due to the dimensional difference between the outer diameter and the inner diameter of the thick part 12 is produced in the thick part 12. Since this strain is propagated to the above-mentioned pressure sensitive diaphragm 11 for detecting a differential pressure, the resistance values of the differential pressure resistors 111 to 114 are correspondingly changed. Moreover, the magnitude of this strain reaches as much as 5 to 50% of the maximum strain which is produced in the pressure sensitive diaphragm 11 when measuring the differential pressure. In such a state in which the high strain is produced, when the differential pressure is applied to the both surfaces of the pressure sensitive diaphragm 11 for detecting a differential pressure, the diaphragm 11 also senses the differential pressure to be deformed. As a result, the large changes of the resistance values occur in the differential pressure resistors 111 to 114. In this deformation process, the uniform and large static strain is produced in the pressure sensitive diaphragm 11 for detecting a differential pressure. Therefore, the distribution of the strain of the diaphragm 11 is different from the distribution of the strain thereof under the atmospheric pressure (the static pressure=0). That is, such a phenomenon occurs that the output characteristics of the differential pressure sensor under the atmospheric pressure are different from the output characteristics of the differential pressure sensor under the static pressure. It is estimated that the output change (span change) occurs, as described above, even in a state in which the sensor chip 1 is independently provided. Moreover, in terms of the practical use, as shown in FIG. 1, the sensor chip 1 must be necessarily provided with the additional elements such as the fixing base 2. As a result, since the sensor chip 1 is influenced by the strains due to the provision of the additional elements when applying the static pressure, the span change is further increased.

The above-mentioned zero-point-change and the span change of the differential pressure sensor as the main strain sensor of the multiple function type sensor become a problem in the measurement of the differential pressure. In particular, the span change becomes an important problem because the span change is exceedingly related to the accuracy of the measurement of the differential pressure and it strongly influences the accuracy of the control of the point. Moreover, for the differential pressure sensor which is employed in the recent instrumentation of the measurement of the differential pressure in the region of the low differential pressure, the pressure sensitive diaphragm 11 for detecting a differential pressure needs to be further thinned to improve the sensitivity. In this case, however, since the span change is correspondingly increased, it is impossible to readily improve the sensitivity of the differential pressure.

In order to solve the above-mentioned problems, in the prior art sensor, there is employed a method in which the static pressure sensor for sensing a static pressure is provided as the auxiliary sensor on the sensor chip, and the output sent from the static pressure sensor is utilized to compensate both the zero-point-change and the span change of the differential pressure sensor. However, some problems are included in this method. In particular, in the multiple function type sensor which is designed in such a way as to utilize the difference between the modulus of longitudinal elasticity of the sensor chip 1 and that of the fixing base 2 in order to obtain the static pressure signal, a large bending strain is produced in the thick part 12 of the sensor chip 1 due to the obtaining of the static pressure signal. This bending strain is propagated to the pressure sensitive diaphragm 11 for detecting a differential pressure to greatly interfere with the output of the differential pressure sensor. Therefore, in order to obtain a differential pressure sensor having high accuracy, it is necessary to clarify the relationship between the input and the output of the differential pressure sensor at each temperature, each static pressure, and each differential pressure point. In order to obtain the information of this input-output relationship, the information of the input-output characteristics of the differential pressure sensor needs to be collected while changing the temperature and the static pressure. However, since the enormous amount of information must be collected, it is impossible in the prior art sensor to collect that information to perform the correction.

That is, the static pressure sensor, which is provided to compensate the zero-point-change and the span change of the differential pressure sensor as the main strain sensor of the multiple function type differential pressure sensor when applying the static pressure, provides the effects as its own way. In this case, however, since the excessive strain is produced in the pressure sensitive diaphragm of the differential pressure sensor as the main strain sensor, a further complicated manufacturing process and compensation method are required.

In the present invention, in order to solve those various kinds of problems, the shape of the fixing base is devised so that the zero-point-change and the span change of the differential pressure sensor are sufficiently reduced in terms of structure to improve the characteristics of the differential pressure sensor without compensation. As a result, it is possible to reduce both the zero-point-change and the span change to utilize the static pressure sensor as the line pressure sensor.

In FIG. 1 and FIG. 2, at least one temperature sensing resistor 155 is formed in the thick part 12 of the multiple function type differential pressure sensor chip 1 other than the pressure sensitive diaphragm 11 for detecting a differential pressure. This temperature sensing resistor is a P type resistor which is arranged in a direction of the <100> axis, which represents the minimum sensitivity of the piezoresistance coefficient in the (100) plane, and it hardly senses the differential pressure and the static pressure. The resistor 155 is formed so as to have a predetermined resistance value by the same process as that in the differential pressure resistors 111 to 114.

On the other hand, with respect to the static pressure sensor as another auxiliary sensor, in the same manner as in the temperature sensing resistor 155, resistors 151 to 154 are formed in parallel with or perpendicularly to the same crystal axis as that of the above-mentioned differential pressure resistors. Out of the static pressure resistors 151 to 154, the resistors 151 and 154 are formed on one surface which has the thin part 15 in a part of the thick part 12 of the sensor chip 1. In the other surface of the thin part 15, a recess part 121 is formed so as to confront the joining part on one surface of the fixing base 2. When applying the static pressure, the recess part 121 acts as a reference chamber (an atmospheric pressure chamber or a vacuum chamber), and the thin part 15 acts as a pressure sensitive diaphragm for detecting a static pressure. Therefore, in the same manner as in the resistors on the pressure sensitive diaphragm 11 for detecting a differential pressure, the large resistance changes can be obtained in the resistors 151 and 154 formed on the thin part 15. On the other hand, the other two resistors 152 and 153 are formed in the thick part 12 of the sensor chip 1 so that their resistance values are hardly changed when applying the static pressure. The resistors 151 to 154 are connected to one another so as to form a bridge circuit as shown in FIG. 3, and their outputs can be taken out through terminals h to k shown in FIG. 3. In the present embodiment, as described above, since the bridge system employs the two active gauge systems, its output is smaller than that of the differential pressure sensor. However, the sufficient output can be obtained as the output of the line pressure sensor.

On the upper surface of the multiple function type differential pressure sensor 1 are formed a protective coat 18 for protecting the differential pressure resistors, the static pressure resistors and the temperature sensing resistor, an aluminium wiring 16 for connecting the resistors to one another in the manner as shown in FIG. 3, and bonding pads a to k. In this connection, the protective coat 18 is formed on only the resistors and the thick part of the sensor chip 1, and is not formed on the pressure sensitive diaphragm 11 for detecting a differential pressure. By adopting such an arrangement, when the temperature is changed, the influence of the thermal strain, which is due to the difference between the material of the protective coat 18 and that of the sensor chip 1, can be removed. Moreover, this effect becomes large as the pressure sensitive diaphragm 11 for detecting a differential pressure is further thinned (sensor for detecting a low differential pressure).

FIG. 4 shows schematically the principle, of the present invention, of reducing the zero-point change and the span change. FIG. 4(a) shows the shape of the multiple function type differential pressure sensor chip 1 of FIG. 1 in a state in which no load is applied. FIG. 4(b) shows the shape of the sensor chip 1 in a state in which the static pressure is applied to the sensor chip 1. When applying the static pressure to the sensor chip 1, since the thick part 12 of the sensor chip 1 defines the pipe-shaped part (its outer diameter is 2A and its inner diameter is 2B), the sensor chip is deformed inwardly and also is deformed downwardly by the static pressure applied to the upper surface. The deformed shape is represented by a solid line of FIG. 4(b). At this time, the strain corresponding to the static pressure is produced in the pressure sensitive diaphragm 11 of the differential pressure sensor due to the difference between the strains. In this state in which this static pressure strain is produced, if the differential pressure is applied, the pressure sensitive diaphragm for detecting a differential pressure will be subjected to the differential pressure strain in the state in which the above-mentioned static pressure strain is produced. Since this static pressure strain greatly influences the sensor chip when the differential pressure strain is produced, it is different from the strain which is due to only the differential pressure under the atmospheric pressure (static pressure=0). Therefore, under the static pressure, the span is changed. However, in the state (the static pressure=Ps, and the differential pressure=0) shown in FIG. 4(b), since the uniform static pressure strain is produced in both the pressure sensitive diaphragm 11 for detecting a differential pressure and the thick part 12, the zero-point-change does not occur.

Therefore, in order to remove both the zero-point-change and the span change under the static pressure, such a method may be adopted that as shown in FIG. 4(b), the uniform tensile force F acts on the thick part 12 of the sensor chip 1, and then, as shown in FIG. 4(c), the shape of the sensor chip 1 is returned to the shape (the original shape shown in FIG. 4(a)) in parallel which is indicated by a dashed line. Then, it is possible to suppress the occurrence of both the zero-point-change and the span change. If the static pressure corresponding to Ps shown in FIG. 4(c) acts on the bonding surface of the thick part 12 of the sensor chip 1 to the fixing base 2, this tensile force F can be generated by the Poisson effect. Since the magnitude of Ps' is generally equal to that of the static pressure Ps, in other words, this provides the effect equal to that the thick part 12 of the sensor chip 1 is under the hydrostatic pressure. Then, in the present embodiment, since the static pressure Ps acts on the other surface 21 of the fixing base 2 opposite to one surface thereof to which the sensor chip 1 is bonded (refer to FIG. 4(d)), the thick part 12 of the sensor chip 1 can be maintained at the hydrostatic pressure state. The range required for securing the hydrostatic pressure state is sufficiently maintained by only securing the area of the thick part of the sensor chip 1. Although the smaller the thickness of the fixing base becomes, the better, a predetermined thickness is required from the point of view of the strength.

Even when the materials used for the fixing base 2 and the sensor chip 1 are changed, the tensile force F can be generated in the same manner as in the Poisson effect when applying the hydrostatic pressure. For example, if the fixing base 2 is made of a material which has the modulus of longitudinal elasticity smaller than that of the sensor chip 1, and its thickness is set to a value which is substantially equal to to the thickness of the sensor chip 1, when applying the static pressure, the strain difference is generated between the thick part 12 of the sensor chip 1 and the bonding part of the fixing base 2 confronting the sensor chip 1. The strain difference allows the positive bending strain to be produced on the upper surface of the thick part 12. This bending strain acts as a force for stretching outwardly the pressure sensitive diaphragm 11 of the sensor chip 1. On the other hand, even when the fixing base 2 is made of a material which has the modulus of longitudinal elasticity larger than that of the sensor chip 1, if the thickness of the fixing base 2 is set to a smaller value than the thickness of the former, it is possible to generate the tensile force for stretching outwardly the pressure sensitive diaphragm 11 of the sensor chip 1.

Moreover, in the embodiment shown in FIG. 1, the other surface of the fixing base 2 acts as a bonding part for mounting the sensor chip 1 to the housing 4. On the other hand, at least one thin part 22 is provided between that bonding part and a part of the fixing base 2 having the bonding surface to the thick part 12 of the sensor chip 1 (i.e., a part for maintaining the sensor chip at the hydrostatic pressure state). Moreover, another thin part 23 is provided in the boundary between that thin part 22 and the joining part 21, thereby to separate the thin part 22 in terms of shape. The thin part 22 is positioned outside the thick part of the sensor chip 1, i.e., it is positioned in the area which is located outside the outer periphery of the sensor chip 1. In this connection, since the thin part 22 acts as a part for absorbing the thermal strain from the housing 4 or the pressure strain when applying the static pressure, it does not disturb the state of the hydrostatic pressure which is provided by the thick part 12 of the sensor chip 1 and the joining part 21 of the fixing base 2.

Figure 5A:
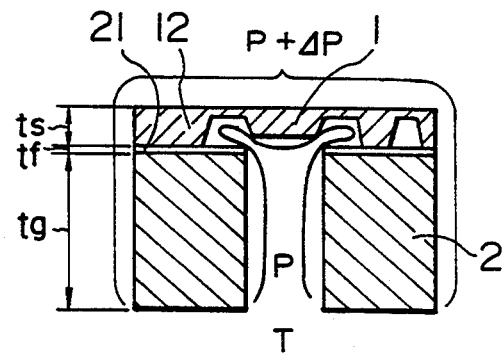
FIGS. 5A and 5B, and 5C are respectively cross-sectional views and a graphical representation of the characteristics of the differential pressure sensor of the present invention when a thickness of a joining part is changed.
Figure 5B:
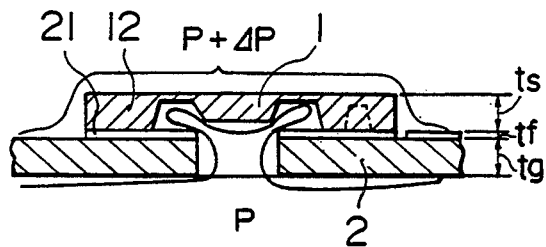
Figure 5C:
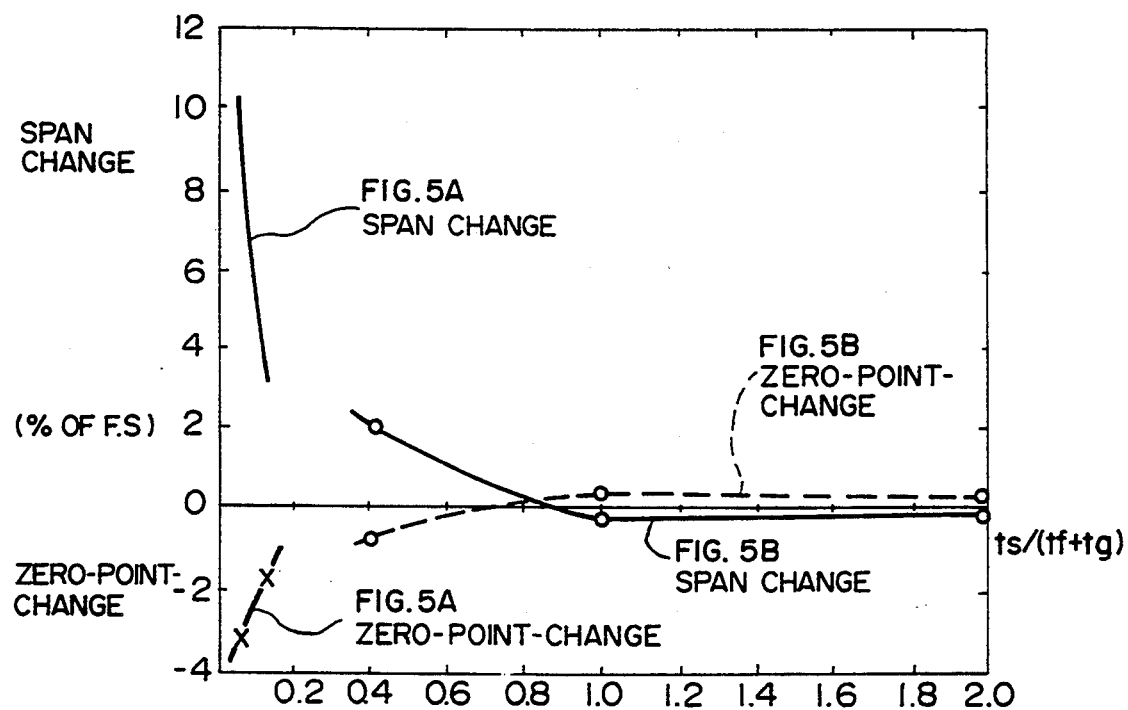

FIGS. 5A and 5B are respectively cross sectional views each showing a structure of the multiple function type differential pressure sensor which is constructed on the basis of the above-mentioned principle, and FIG. 5C is a graphical representation showing the characteristics of the multiple function type differential pressure sensor which was manufactured on the basis of the principle of the present invention. In FIG. 5B, in order to cause the uniform tensile force to act on the thick part 12 of the sensor chip 1, a pressure P (static pressure) is caused to act on the thick part 12 of the sensor chip 1 through the bonding part 21 of the fixing base 2. As a result, a force for stretching the thick part 12 of the sensor chip 1 outwardly is generated in the thick part 12 by the Poisson effect, so that the sensor chip 1 is returned to the shape indicated by the dashed line as shown in FIG. 4(c). In other words, this is substantially equal to that the thick part 12 of the sensor chip 1 is maintained at the state of the hydrostatic pressure by utilizing the pressure P. Therefore, the means for obtaining effectively this effect is to adopt a structure in which this pressure is directly applied in the direction of the bonding surface of the thick part 12 of the sensor chip 1 to the fixing base 2. However, with such a structure, since the pressure on the side of the high pressure (P+ΔP) and the pressure on the side of the low pressure (P) cannot be separated from each other, there is no realizability and also it is impossible to mount the assembly made up of the sensor chip 1 and the fixing base 2 to the housing 4. Therefore, the fixing base 2 must be necessarily provided. In this connection, the fixing base 2 needs to be provided so as not to harm the above-mentioned effect. In general, the smaller the thickness of the fixing base 2 is, the more effectively the force due to the pressure P is transmitted to the thick part of the sensor chip 1 without decreasing. On the other hand, if the fixing base 1 has not a predetermined thickness in terms of strength, the sufficient pressure proof capability will not be obtained.

FIG. 5C is a graphical representation showing the relationship between the thickness (tg+f) of the fixing base 2 and the thickness (rs) of the thick part 12 of the sensor chip 1 which was obtained on the basis of the above-mentioned viewpoint. Moreover, in the figure, the result in the case where the general structure which is different from that of the present invention was employed (the structure shown in FIG. 5A) is also shown.

As apparent from those figures, it is understood that with the structure of the present invention, when the thickness of the fixing base 2 is set to a value less than or equal to a certain value, both the zero-point-change and the span change are very small. On the other hand, in the case of the structure of the prior art sensor, those changes are very large. Therefore, according to the present invention, if the thickness of the fixing base 2 is especially set to a value less than or equal to (=1.0 times) the thickness of the thick part 12 of the sensor chip 1, both the zero-point-change and the span change can be reduced to the respective ranges in which there is no problem in terms of practical use.

As described above, in order to reduce both the zero-point-change and the span change of the differential pressure sensor to zero or very small values, it is required that the joining part 21 is provided in the fixing base 2 so as to have a shape which has the area surrounding the entire thick part of the sensor chip 1, and the thickness of the bonding part 21 needs to be decreased, in particular, it needs to be decreased to a value less than or equal to the thickness of the thick part 12 of the sensor chip 1. At this time, the thick part 12 of the sensor chip 1 can be maintained at the hydrostatic pressure state. As a result, the zero-point-change and the span change can be reduced to zero or very small values.

Further, in addition to the above-mentioned bonding part, in the fixing base 2, at least one thin part 22 is provided in the area which is located outside the outer periphery of the sensor chip 1, whereby the above-mentioned hydrostatic pressure state can be provided further surely, and also the thin part 22 can be operated as a part which can absorb the thermal strain and the pressure strain when applying the static pressure. By this function, the pressure sensitive diaphragm 11 for detecting a differential pressure of the differential pressure sensor chip 1 is free from the influence of the thermal strain and the pressure strain due to the external environment. Therefore, in the multiple function type differential pressure sensor having such a structure, the zero-point-change and,the span change can be reduced to zero or very small values and also the static pressure sensor as the auxiliary sensor is not loaded at all. Therefore, it is possible to utilize effectively the static pressure sensor as the line pressure sensor.

Figure 6A:
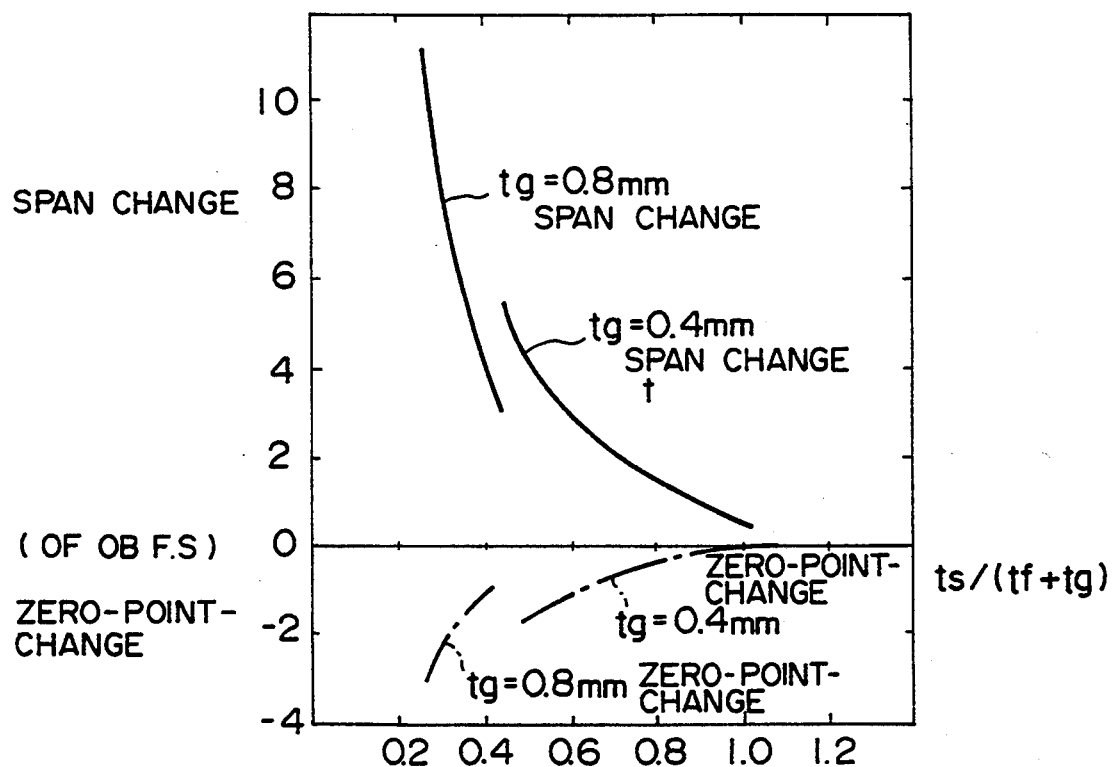
FIGS. 6A and 6B are respectively a graphical representation of the characteristics and a cross-sectional view of the differential pressure sensor of the present invention when the thickness of the joining part having two layers is changed.
Figure 7A:
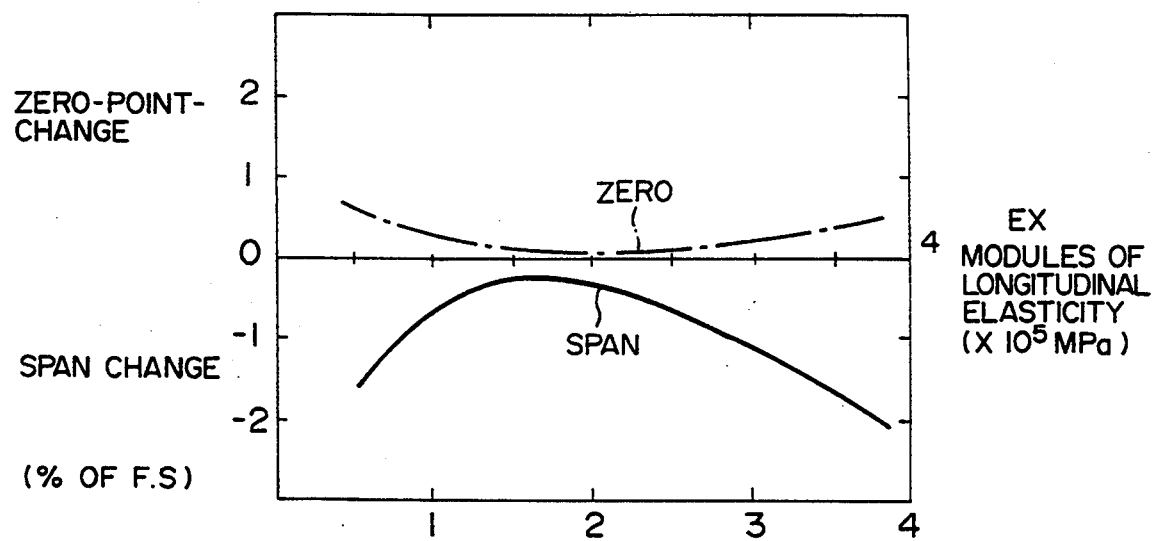
FIGS. 7A and 7B are respectively a graphical representation of the characteristics and a cross-sectional view of the differential pressure sensor of the present invention when a modulus of longitudinal elasticity of a fixing base is changed.

FIG. 6A and FIG. 7A show characteristic views of the respective multiple function type differential pressure sensors each of which is manufactured on the basis of the above-mentioned principle. In those figures, the results are shown which are obtained by confirming the above-mentioned functional parts of the fixing base when the pressure sensitive diaphragm 11 for detecting a differential pressure is very thinned (in the differential pressure sensor in the low differential pressure area, the thickness of the diaphragm is about 10 μm and the diameter of the diaphragm is about 4 mm).

Figure 6B:
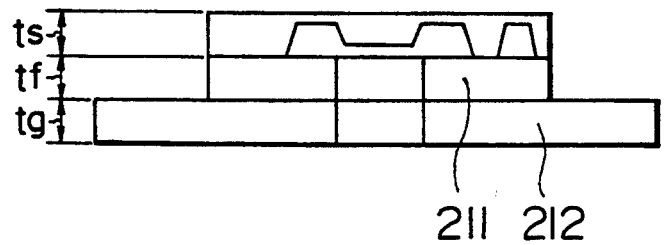

FIG. 6A shows the result which was obtained by measuring the zero-point-change and the span change in the case where when the fixing stage was formed so as to have the two layer structure as shown in FIG. 6B, i.e., the joining part 21 was separated into a first joining part 211 and a second joining part 212, for example, of an oxide solder, metallic .solder or binder, and the thickness ts of the thick part 12 of the sensor chip 1 was set to a constant value, the thickness tf of the first joining part 211 and the thickness tg of the second joining part 212 were changed. As apparent from the figure, both the zero-point-change and the span change are largely changed depending on the thickness tf of the first joining part 211 and the thickness tg of the second joining part 212. However, it is understood that when the sum of the thicknesses tf and tg of the joining parts of the fixing base is smaller than the thickness ts of the thick part of the sensor chip 1, both the zero-point-change and the span change are very small. Incidentally, with respect to the material used, the joining part 21 was made of a material which has the modulus of longitudinal elasticity considerably smaller than that of the material of the sensor chip 1.

Figure 7B:
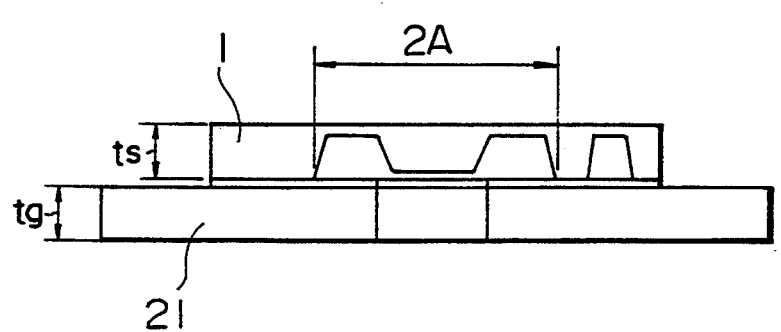

FIG. 7A shows the result which was obtained by measuring the zero-point-change and the span change in the case where when the assembly was made up of only the sensor chip 1 and the fixing base 2 (refer to FIG. 7B), and the thickness tg of the fixing base 2 was made smaller than or equal to the thickness ts of the sensor chip 1 (tg≦ts), the modulus of longitudinal elasticity of the fixing base 2 was changed in the range of $0.5 \times 10^5$ to $4 \times 10^5$ MPa. As apparent from the figure, the zero-point-change and the span change are very small with respect to the change of the modulus of longitudinal elasticity, and the absolute values thereof are also very small. Therefore, it is understood that in the multiple function type differential pressure sensor which is constructed on the basis of the above-mentioned principle, it is possible to widen the range of selecting a material for the fixing base for fixing the sensor chip thereto, and also it is possible to reduce both the zero-point-change and the span change.

Moreover, the fixing base 2 related to the present embodiment shown in FIG. 1 has the structure based on the above-mentioned principle and also has the shape which is determined by considering the improvement in the joining to the housing 4 and the characteristics into consideration. More specifically, if the housing 4, the bonding part 3 and the fixing base 2 are different in material from one another, the various kinds of strains (the joining strain, the thermal strain, and the static pressure strain) are produced when the joining is performed, when the temperature is changed and when the static pressure is applied. Further, for the purpose of absorbing the various kinds of strains to prevent the sensor chip 1 from being influenced by the various kinds of strains, the fixing base 2 is provided with another thin part 23 near the joining part between the fixing base 2 and the housing 4. This thin part 23 also acts as the absorber for absorbing the various kinds of strains or the separation part.

Further, in the present embodiment, in the process of inserting the above-mentioned sensor chip assay (the assembly made up of the semiconductor chip 1 and the fixing base 2) into the housing 4 to join the sensor chip assay thereto, an insertion guiding part 28 is provided in a part of the thin part 22, and the insertion guiding part 28 is inserted into a guiding part 44 provided in the housing 4, whereby the positioning and the joining of the sensor chip assay can be readily performed. Moreover, since the end part of the thin part 22 is directed upwardly, i.e., substantially parallel to the surface of the sensor chip 1, even in the joining process after the positioning, a series of works can be continuously performed, and also the structure is simple so that the manufacture can be readily performed.

FIG. 8 is a cross sectional view showing a structure of the multiple function type differential pressure sensor of another embodiment of the present invention. In the present embodiment, as for the material of the fixing base 2 which has the above-mentioned structure of the present invention, Fe-Ni series alloy is employed which has the modulus of longitudinal elasticity and the coefficient of linear expansion substantially equal to those of the above-mentioned multiple function type sensor chip 1, and a corrugated part 24 for absorbing the pressure strain is provided between the joining part 21 and the thin part 22 of the fixing base 2 in the form of single shape. The bonding layer 20 is made of oxide solder having good insulation such as low melting point glass, or a ceramics series material. The fixing base 2 is readily joined to the guiding part 44 provided in the housing 4, through a joining part 22 and the insertion guiding part 24, by the argon arc welding or the plasma welding. As a result, the effects of the present invention as described above are not harmed and the structure which has the larger resistance to the external pressure strain can be obtained so that the reliability can be improved.

Moreover, while not illustrated in the present embodiment, even when the fixing base 2 is made of silicon which is the same material as that of the multiple function type sensor chip 1, or the fixing base 2 is made of ceramics, such as boro-silicate glass, SiC or SiN, which has the coefficient of linear expansion substantially equal to that of silicon, the thin part 22 as shown in FIG. 1 or FIG. 8 can be formed in the area other than the joining part of the fixing base 2. As for the bonding layer, in accordance with the function (insulating characteristics or the like), a bonding layer made of oxide solder such as low melting point glass, a bonding layer made of an Au thin film, metallic solder of an Au-Si or Au-Sn series alloy thin film, or an organic or inorganic binder, or the like can be selected to be employed. Even with such a structure, as apparent from FIG. 7A, with respect to the change of the modulus of longitudinal elasticity of the fixing base when changing the material, the zero-point-change and the span change are very small and also their absolute values are very small. Therefore, the above-mentioned effects of the present invention are not harmed.

FIG. 9 is a plan view and cross-sectional view each showing a structure of the multiple function type differential pressure sensor of still another embodiment of the present invention. In the present embodiment, the fixing base 2 is made up of a first joining member 27 and a second joining member 233, and a thin part 22 is provided along the peripheral part of the joining part 21 of the second joining member (along the outer periphery of the chip, i.e., outside the chip). Each of the thickness of the first joining member 27 and that of the joining part 21 of the second joining member 233 is made smaller than the thickness of the thick part of the sensor chip 1, in particular, each of those thicknesses is made less than or equal to the thickness of the thick part of the sensor chip 1, or the sum of those thicknesses is made less than or equal to the thickness of the thick part of the sensor chip 1. Therefore, both the zero-point-change and the span change can be reduced. Incidentally, in the present embodiment, the first joining member 27 is made of boro-silicate glass, and the second joining member 233 is made of a metallic material such as Fe-Ni series alloy. As for the bonding layer 20 between the first joining member 27 and the second joining member 233, as described above, a bonding layer made of oxide solder such as low melting point glass, or a bonding layer made of an Au thin film, metallic solder of an Au-Si or Au-Sn series alloy thin film, or organic or inorganic binder can be selected to be employed.

With respect to the bonding method of bonding a member, by selecting a suitable member to be used, the sensor chip 1 can be joined to the first joining member 27 without through the bonding layer and being strained by the anodic joining method. According to this bonding method, the sensor chip 1 can be joined to the joining member 27 in substrate base (in wafer) and in a lamp by the anodic bonding method. Then, even in the subsequent cutting process, the management can be performed in substrate base (in wafer). Moreover, a hollow hole 29 of the first joining member 27 and the insertion guiding part 234 of the second joining member 233 which has a hollow hole 292 are provided axially, whereby the sensor chip assay (the assembly made up of the sensor chip 1 and the joining member 27) after the cutting process can be readily positioned to the guiding part 23 and also can be joined to the second joining member 233 through the above-mentioned bonding layer 20. In the process of inserting the above-mentioned sensor chip assay (the assembly made up of the sensor chip 1, the first joining member 27 and the second joining member 233) into the housing 4 to mount the sensor chip assay thereto, an insertion guiding part 28 is provided in a part of the thin part 22, and the insertion guiding part 28 is inserted into a guiding part 44 provided in the housing 4, whereby the positioning and the joining of the sensor chip assay can be readily performed. Further, the end part of the thin part 22 is directly upwardly, i.e., substantially parallel to the surface of the sensor chip 1. Therefore, the end part acts as an antirunning part when forming the bonding layer 20, so that the further uniform bonding layer can be formed, and also even in the joining process after the positioning, a series of works can be continuously performed. In addition, since the shape of the end part is simple, the end part can be readily manufactured.

With such a structure, since the modulus of longitudinal elasticity of the sensor chip 1 is largely different from that of the first joining member 27, when applying the static pressure, the bending strain due to the strain difference is produced in the upper surface of the sensor chip 1. Therefore, since even if the pressure sensitive diaphragm for detecting a static pressure is not provided, the static pressure signal can be obtained, there is indeed no need for considering the strength of the pressure sensitive diaphragm for detecting a static pressure (the maximum allowable working pressure) into consideration. As a result, it is possible to provide a sensor the maximum allowable working pressure of which is very high, and the miniaturization can be further promoted. On the other hand, it is to be understood that such a structure as to include the pressure sensitive diaphragm for detecting a static pressure may be adopted as described above.

Moreover, even if the second joining member is made of a metallic material other than the Fe-Ni series alloy, in the joining surface between the thin part 22 of the second joining member 233 and the housing 4 is provided a joining part 3 which is made of oxide solder such as flexible low melting point glass, organic or inorganic binder, or metallic solder, whereby the thin part 22 of the second joining member 233 can be readily joined to the housing 4. Therefore, the second joining member 233 may be also made of an Fe series metallic material or any other non-ferrous material. On the other hand, as shown in FIG. 5B and FIG. 6B, the method which is different from the method of employing the above-mentioned materials will be also applicable by changing the thicknesses and the shapes of the constituent members. For example, as for the candidate for the material which is applicable to the first joining member 27, silicon, ceramics, or Fe-Ni series alloy is available which has the coefficient of linear expansion substantially equal to that of the sensor chip 1. As for the candidate for the material which is applicable to the second joining member 233, silicon, ceramics, or Fe or Fe-Ni series alloy is available which has the coefficient of linear expansion substantially equal to that of the sensor chip 1. Therefore, the suitable material can be selected arbitrarily from the group consisting of the above-mentioned materials.

As described above, the present embodiment provides excellent performance in selectivity of the material as well as manufacture. Moreover, since each member has the single shape, the present embodiment provides excellent performance in profitability as well.

Figure 10:
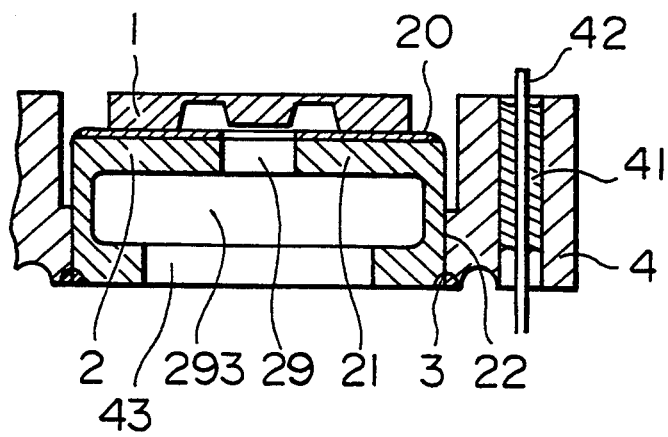
FIG. 10 is a cross-sectional view showing a structure of the multiple function type differential pressure sensor according to yet another embodiment of the present invention.

FIG. 10 is a cross sectional view showing a structure of the multiple function type differential pressure sensor of yet another embodiment of the present invention. The present embodiment is designed in such a way that a cylindrical thin part 22 is included in the fixing base 2 having the structure of the present invention, and the end part of the cylindrical thin part 22 of the fixing base 2 is fixedly joined to the housing 4 in the position below the rear surface of the semiconductor chip (i.e., in the position below the rear surface of the semiconductor chip opposite to the surface having the gauge resistor, and in general, on the side of the low pressure of the differential pressure sensor) by the argon arc welding method or the plasma welding method. At this time, a space which is defined by the joining part 21 of the fixing base 2 and the cylindrical thin part 22 becomes an additional fluid chamber 293 for adjusting a filled fluid amount difference. The fixing base 2 is made of the Fe-Ni series alloy which has the modulus of longitudinal elasticity and the coefficient of the linear expansion substantially equal to those of the multiple function type sensor chip 1, and the bonding layer 20 is made of oxide solder such as low melting point glass having high insulation, or a ceramics series material.

Even with such a structure, it is to be understood that the above-mentioned effects of the present invention are not harmed. In addition, there are provided the undermentioned effects. That is, in the differential pressure sensor or the multiple function type differential pressure sensor, in general, the dead volume on the side of the high pressure is different from that on the low pressure. As a result, the amount of filled liquid (the filled liquid is generally used in order to protect the sensor from the process fluid) on the side of the high pressure is different from that on the side of the low pressure. At this time, due to the difference between the amount of filled liquid on the side of the high pressure and that on the side of the low pressure, the influence of the temperature newly occurs. The additional fluid chamber 293 for adjusting a filled fluid amount difference serves to positively adjust the filled fluid amount difference in the manufacturing stage in terms of structure. This adjustment can be readily attained by adjusting the shape of the cylindrical thin part 22. As a result, since the filled fluid amount difference can be removed, the working efficiency of the temperature compensation as the subsequent process can be improved.

Moreover, while not illustrated in the present embodiment, the fixing base 2 may be made of silicon which is the same material as that of the multiple function type sensor chip 1, or a ceramics series material such as boro-silicate glass, SiC or SiN which has the coefficient of linear expansion substantially equal to that of the sensor chip 1. As for the bonding layer, in accordance with the function (insulating characteristics or the like), a bonding layer made of oxide solder such as low melting point glass, or a bonding layer made of an Au thin film, metallic solder of an Au-Si or Au-Sn series alloy thin film, or organic or inorganic binder can be selected to be employed. With such a structure as well, as described above, with respect to the change of the modulus of longitudinal elasticity of the fixing base due to the change of the material, the zero-point-change and the span change are very small, and also the absolute values thereof are very small. Therefore, the effects of the present invention are not harmed.

Although the description has been mainly given to the multiple function type differential pressure sensor, it is to be understood that the present invention can be applied to the simple differential pressure sensor. Moreover, with respect to the structure of the semiconductor chip to be used, even the normal semiconductor chip which has not the thick part at the center part thereof can be also available.

As set forth hereinabove in detail, according to the present invention, the zero-point-change and the span change of the differential pressure sensor and the multiple function type differential pressure sensor when applying the static pressure can be removed in terms of structure. Therefore, it is possible to obtain the sensor which is capable of detecting a differential pressure signal at higher accuracy. Moreover, since the static pressure signal of the pressure sensor according to the present invention can be utilized for the pressure sensor, when the present invention is applied to the plant, the number of installation of the pressure measuring instruments and apparatus can be reduced, so that the labor saving can be attained.

Further, the amount of information for compensating the output of the differential pressure sensor can be largely reduced. Therefore, the number of processes required for the manufacturing management when manufacturing the sensor, and the number of circuits for processing an output signal of the sensor can be also largely reduced. In addition, there are the effects in that the present invention provides excellent performance in terms of manufacture and reliability.

We claim:

1. A differential pressure sensor including a semiconductor chip having a pressure sensitive part for sensing a difference between pressures respectively applied to a first surface of said semiconductor chip and to a second surface of said semiconductor chip opposite to said first surface, and a fixing base joined, on a joining surface at a joining part of said fixing base, to said semiconductor chip such that said semiconductor chip is fixed thereto, a path for guiding one pressure of said pressures to said pressure sensitive part on said second surface of said semiconductor chip, said path being provided in said fixing base, wherein a thickness of said joining part of said fixing base at which said fixing base is joined to said semiconductor chip is made less than or equal to a thickness of a body part of said semiconductor chip at which said semiconductor chip is joined to said fixing base and
said pressure which is applied to said second surface of said semiconductor chip is also applied to said fixing base on a surface opposite to said joining surface at a portion which opposes said joining part.

2. A differential pressure sensor as claimed in claim 1, wherein an outer periphery of said joining part has a reduced part having a thickness which is less than that of said joining part.

3. A differential pressure sensor as claimed in claim 1, wherein said pressure sensitive part is provided in said semiconductor chip.

4. A differential pressure sensor as claimed in claim 1, further comprising a temperature sensing part for sensing a temperature, said temperature sensing part being provided in said semiconductor chip.

5. A differential pressure sensor including a semiconductor chip having a pressure sensitive part for sensing a difference between pressures respectively applied to a first surface of said semiconductor chip and to a second surface of said semiconductor chip opposite to said first surface, a fixing base having a joining part joined to said semiconductor chip such that said semiconductor chip is fixed thereto, a path for guiding one pressure of said pressures to said pressure sensitive part on said second surface of said semiconductor chip, said path being provided in said fixing base, wherein
an outer periphery of said joining part of said fixing base has a reduced part which has a thickness less than that of said joining part.

6. A differential pressure sensor as claimed in claim 5, wherein a thickness of said joining part is made less than or equal to a thickness of a body part of said semiconductor chip.

7. A differential pressure sensor including a semiconductor chip having a pressure sensitive part for sensing a difference between pressures respectively applied to a first surface of said semiconductor chip and to a second surface of said semiconductor chip opposite to said first surface, a fixing base with a joining surface having a joining part joined to said semiconductor chip such that said semiconductor chip is fixed thereto, and a housing joined to said fixing base at an attachment part of said housing to mount said fixing base thereto, a path for guiding one pressure of said pressures to said pressure sensitive part on said second surface of said semiconductor chip, said path being provided in said fixing base, wherein
a hollow part is defined between said housing and a surface of said fixing base opposite to said joining surface at a portion which opposes said joining part of said fixing base, a thickness of said joining part being less than or equal to a thickness of a body part of said semiconductor chip at which said semiconductor chip is joined to said fixing base, and wherein said pressure applied to said second surface is introduced into said hollow part.

8. A differential pressure sensor as claimed in claim 7, wherein an outer periphery of said joining part of said fixing base has at least one reduced park a thickness of which is less than a thickness of said joining part.

9. A differential pressure sensor as claimed in claim 7, wherein said hollow part is defined outside a joining area between said semiconductor chip and said fixing base.

10. A differential pressure sensor as claimed in claim 7, wherein a thickness of said attachment part of said fixing base joined to said housing is made less than a thickness of a part of said fixing base which is located inside said joining part.

11. A differential pressure sensor as claimed in claim 7, wherein a corrugated part, which has a thickness less than that of said joining part and is located between said joining part and said attachment part, is provided in said fixing base.

12. A differential pressure sensor as claimed in claim 7, wherein a cylindrical part, which has a thickness less than that of said joining part and is located between said joining part and said attachment part, is provided in said fixing base.

13. A differential pressure sensor as claimed in claim 7, wherein said fixing base is made of a Fe series alloy, and a fixing joint between said fixing base and said semiconductor chip is formed of an oxide solder layer, and an attachment joint between said fixing base and said housing is formed of a weld.

14. A differential pressure sensor as claimed in claim 7, wherein said fixing base is made of borosilicate glass, and a fixing joint between said fixing base and said semiconductor chip is formed by an anodic joining method, and an attachment joint between said fixing base and said housing is formed of one of an oxide solder layer and a metallic solder layer.

15. A differential pressure sensor as claimed in claim 7, wherein said fixing base is made of borosilicate glass, and a fixing joint between said fixing base and said semiconductor chip is formed by an anodic joining method, and an attachment joint between said fixing base and said housing is formed by one of an organic said inorganic binder.

16. A differential pressure sensor as claimed in claim 7, wherein said fixing base is made of ceramics, and a fixing joint between said fixing base and said semiconductor chip is formed of one of an oxide solder layer and a metallic solder layer, and an attachment joint between said fixing base and said housing is formed of one of an oxide solder layer and a metallic solder layer.

17. A differential pressure sensor as claimed in claim 7, wherein said fixing base is made of ceramics, and a fixing joint between said fixing base and said semiconductor chip is formed of one of an oxide solder layer and a metallic solder layer, and an attachment joint between said fixing base and said housing is formed of one of an organic and inorganic binder.

18. A differential pressure sensor as claimed in claim 7, wherein said fixing base is made of silicon, and a fixing joint between said fixing base and said semiconductor chip is formed of one of a low melting point glass and an oxide film, and an attachment joint between said fixing base and said housing is formed of one of an organic and inorganic binder.

19. A differential pressure sensor as claimed in claim 7, wherein said fixing base is made of silicon, and a fixing joint between said fixing base and said semiconductor chip is formed of one of a low melting point glass and an oxide film, and an attachment joint between said fixing base and said housing is formed of one of an oxide solder layer and a metallic solder layer.

20. A differential pressure sensor including a semiconductor chip having a pressure sensitive part for sensing a difference between pressures respectively applied to a first surface of said semiconductor chip and to a second surface of said semiconductor chip opposite to said first surface, a fixing base with a joining surface having a joining part joined to said semiconductor chip such that said semiconductor chip is fixed thereto, and a housing part joined to said fixing base at an attachment part of said housing to mount said fixing base thereto, a path in said fixing base for guiding one pressure of said pressures to said pressure sensitive part on said second surface wherein
 a hollow part is defined between said housing and a surface of said fixing base opposite to said joining surface at a portion which opposes said joining part of said fixing base joined to said semiconductor chip,
 an outer periphery of said joining part of said fixing base has a reduced part, a thickness of said reduced part being less than a thickness of said joining part of said fixing base, and
 said pressure applied to said pressure sensitive part is introduced into said hollow part.

21. A differential pressure sensor as claimed in claim 20, wherein a thickness of said joining part of said fixing base joined to said housing is made less than that of a base part of said fixing base which is located inside said joining part.

22. A differential pressure sensor as claimed in claim 20, wherein said hollow part is defined outside a joining area between said semiconductor chip and said fixing base.

23. A differential pressure sensor including a semiconductor chip having a pressure sensitive part for sensing a difference between pressures respectively applied to a first surface of said semiconductor chip and to a second surface of said semiconductor chip opposite to said first surface, a first fixing base with a first joining surface having a fixing part joined to said semiconductor chip such that said semiconductor chip is fixed thereto, a second fixing base with a second joining surface having a second fixing part joined to said first fixing base to fix said first fixing base thereto, and a housing part joined to said second fixing base at an attachment part of said housing to mount said second fixing base thereto, a path for guiding one pressure of said pressures to said pressure sensitive part on said second surface of said semiconductor chip, said path being provided in said first fixing base and said second fixing base, wherein
 a hollow part is defined between said housing and a surface of said second fixing base opposite to said second joining surface at a portion which opposes said second fixing part between said first fixing base and said second fixing base,
 a thickness of said first fixing base is made to be less than or equal to a thickness of a body part of said semiconductor chip at which said semiconductor chip is joined to said first fixing base, and
 a thickness of said second fixing base is made less than or equal to said thickness of said body part of said semiconductor chip, and
 said pressure applied to said second surface is introduced into said hollow part.

24. A differential pressure sensor as claimed in claim 23, wherein a sum of said thickness of said first fixing base and said thickness of said second fixing base is made less than or equal to said thickness of said body part of said semiconductor chip.

25. A differential pressure sensor as claimed in claim 23, wherein an outer periphery of said second fixing part of said second fixing base joined to said first fixing base has at least one reduced part a thickness of which is made less than a thickness of said second fixing part between said first fixing base and said second fixing base.

26. A differential pressure sensor as claimed in claim 23, wherein said hollow part is defined outside a joining area between said first fixing base and said second fixing base.

27. A differential pressure sensor as claimed in claim 23, wherein a thickness of said second fixing base joined to said housing at said attachment part is made less than that of a part of said second fixing base which is located inside said second fixing part.

28. A differential pressure sensor as claimed in claim 23, wherein a reduced part, which has a thickness less than that of said second fixing part and is located between said second fixing part and said attachment part, is provided in said second fixing base.

29. A differential pressure sensor including a semiconductor chip including a thin substrate portion having a thin part defined by opposing first and second planes, and a thick substrate portion having a thick part defined by opposing third and fourth planes, said thick substrate portion supporting said thin part and being joined to a fixing base, wherein a first pressure is applied to a first surface of said thin substrate portion, and a second pressure is applied to a second surface of said thin substrate portion so as to oppose said first pressure thereby to reflect a difference between said first pressure and said second pressure, wherein said first pressure applied to said thin substrate portion is applied to a first surface of said thick substrate portion, and said second pressure applied to said thin substrate portion is applied to a second surface of said thick substrate portion which is joined to said fixing base.

* * * * *